United States Patent [19]

van der Lely

[11] 4,215,526

[45] Aug. 5, 1980

[54] MOWING MACHINE

[76] Inventor: Cornelis van der Lely, 7, Brüschenrain, Zug, Switzerland

[21] Appl. No.: 949,037

[22] Filed: Oct. 6, 1978

[30] Foreign Application Priority Data

Oct. 6, 1977 [NL] Netherlands ............................ 7710954

[51] Int. Cl.² .................... A01D 35/264; A01D 53/00; A01D 35/00
[52] U.S. Cl. ....................................... 56/12.7; 56/192; 56/295
[58] Field of Search ................. 56/12.7, 192, 295, 235, 56/6, 370

[56] References Cited

U.S. PATENT DOCUMENTS

| 716,552 | 12/1902 | Jolly et al. | 56/95 |
| 1,880,154 | 9/1932 | Rotondo et al. | 56/295 |
| 2,341,486 | 2/1944 | Swertfeger | 56/12.7 |
| 2,506,215 | 5/1950 | Hays | 56/16.7 |
| 2,724,229 | 11/1955 | Graham | 56/17.5 |
| 3,221,484 | 12/1965 | van der Lely | 56/370 |
| 3,391,522 | 7/1968 | Zweegers | 56/192 |
| 3,500,622 | 3/1970 | Bowen | 56/295 |
| 3,540,198 | 11/1970 | Heth et al. | 56/295 |
| 3,664,102 | 5/1972 | Reber | 56/12.7 |
| 3,783,533 | 1/1974 | Konig et al. | 56/6 |
| 3,835,630 | 9/1974 | Av | 56/295 |
| 3,928,911 | 12/1975 | Pittinger, Jr. | 56/12.7 |
| 3,950,923 | 4/1976 | Martenson et al. | 56/295 |
| 3,979,889 | 9/1976 | Vansteelant | 56/192 |
| 4,024,635 | 5/1977 | Mizuno et al. | 56/12.7 |
| 4,054,992 | 10/1977 | Ballas et al. | 56/12.7 |
| 4,065,913 | 1/1978 | Fisher et al. | 56/12.7 |
| 4,090,346 | 5/1978 | Doi | 56/295 |
| 4,104,797 | 8/1978 | Ballas | 56/12.7 |
| 4,134,204 | 1/1979 | Perdue | 56/12.7 |
| 4,138,810 | 2/1979 | Pittinger, Sr. et al. | 56/12.7 |

Primary Examiner—Paul J. Hirsch
Attorney, Agent, or Firm—Mason, Mason and Albright

[57] ABSTRACT

A mowing machine which extends laterally of a tractor and is connected to the lifting device of a tractor which has a frame and two rotors driven through gearing from the power take-off of the tractor. Each rotor includes a hollow tube driven by gears in the frame which causes the rotor to rotate and each rotor carries two cutter members which are driven by rotation of the rotor and through meshing with a stationary gear mounted from a stationary tube which is coaxial with the hollow shaft in the rotor. Six cutters extend from each cutting member and are thus rotated in a direction opposite that of the rotor at a substantially greater speed. A plate member extends from each hollow shaft which has tines connected thereto for moving crop cut by the cutters under the frame and to the rear. The rotors shield the cutters through about 180 degrees of their rotation. Swath forming members are connected to the frame to receive cut crop moved to the rear by rotors whereby same is formed into a swath. In one embodiment, the hollow shaft includes vanes which receive linked cutter members whereby if a cutter member is broken, the link is then extended to provide a further cutter member.

48 Claims, 6 Drawing Figures

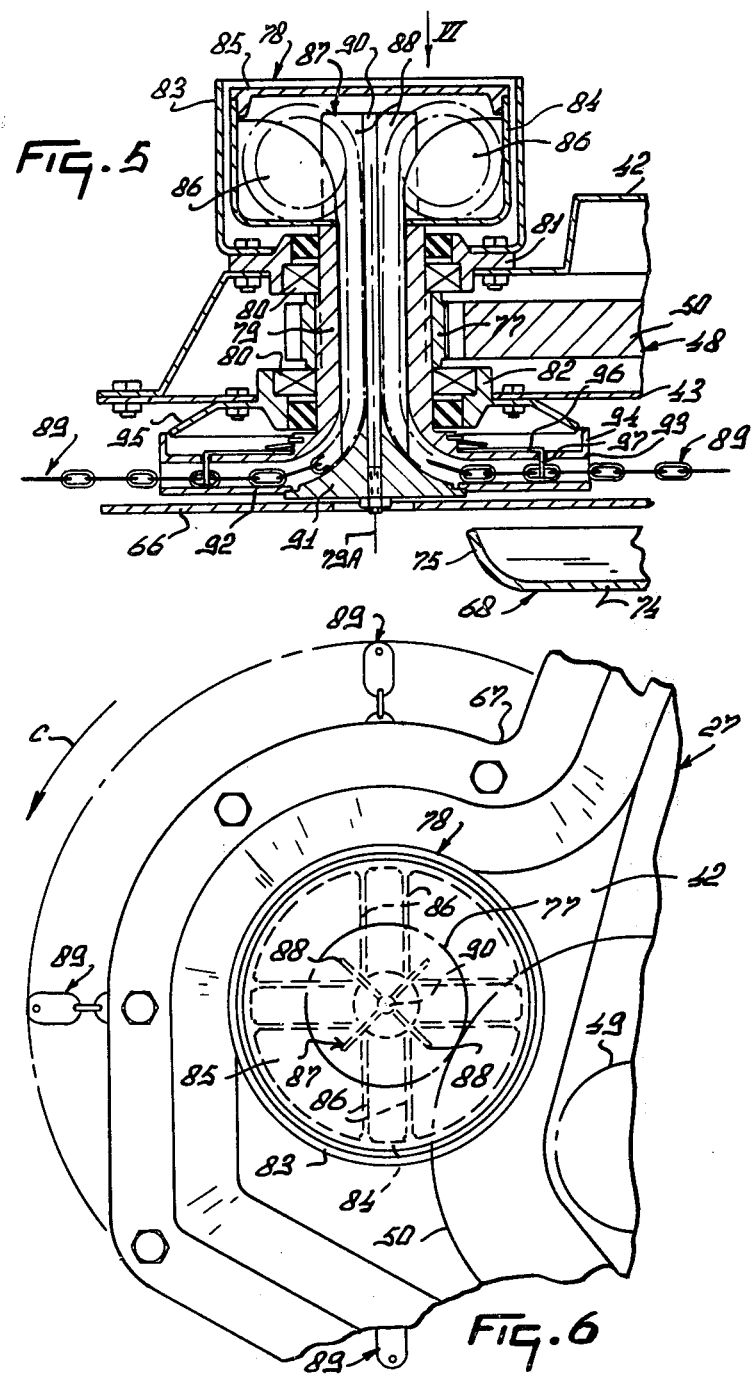

MOWING MACHINE

SUMMARY OF THE INVENTION

This invention relates to mowing machines.

According to the present invention there is provided a mowing machine comprising a rotor which is mounted for rotation about an upwardly extending main axis and which carries a mowing element mounted for rotation about an upwardly extending axis which is spaced from the main axis, the rotor having a plate disposed beneath the mowing element.

For a better understanding of the present invention and to show how it may be carried into effect, reference will now be made, by way of example only, to the accompanying drawings, in which:

BRIEF DESCRIPTION OF THE DRAWINGS

FIG. 5 is a sectional view of another embodiment of part of a mowing machine; and FIG. 6 is a plan view in the direction of the arrow VI in FIG. 5.

DESCRIPTION OF THE PREFERRED EMBODIMENTS

Figure 1:
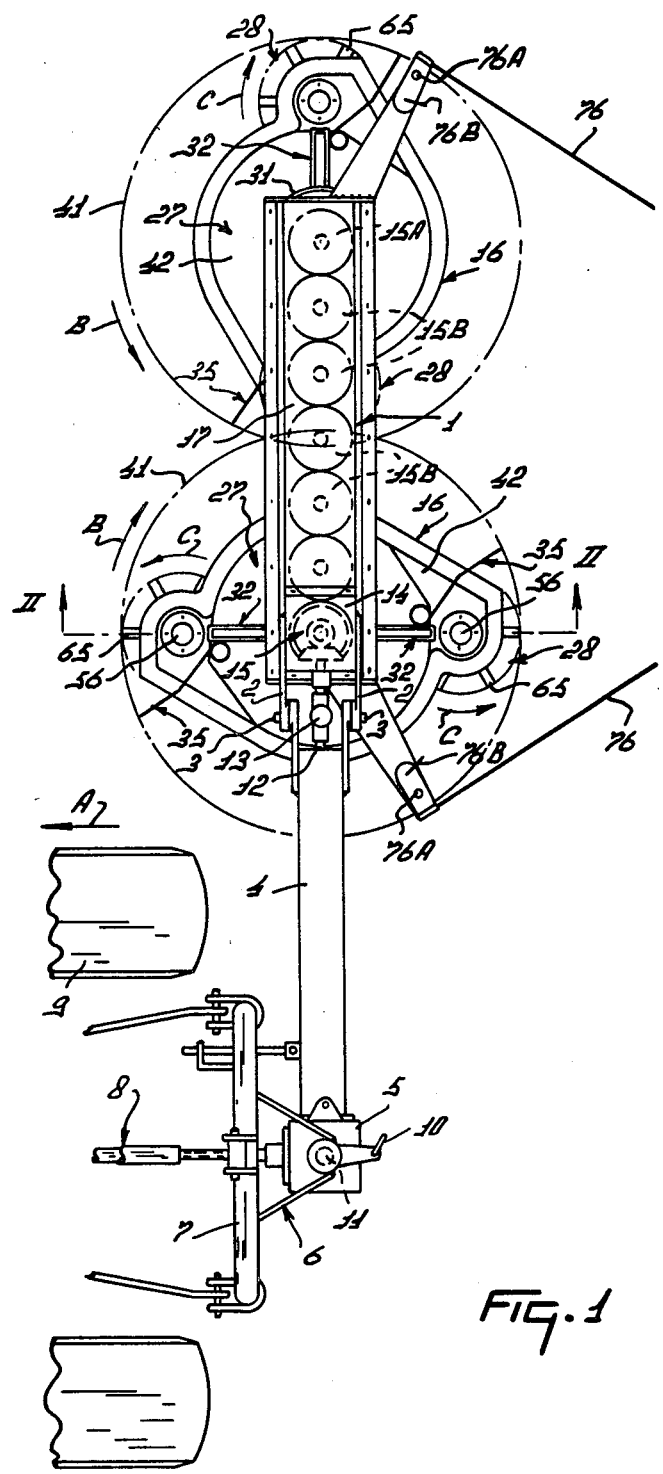
FIG. 1 is a plan view of a mowing machine fastened to a tractor.

The mowing machine shown in FIG. 1 comprises a frame having a main frame beam 1 which extends approximately transversely of the intended direction of operative travel, indicated by an arrow A, and is connected near one end with two parallel plates 2, through which a pivotal shaft member 3, extending in the direction A, passes. This shaft 3 member establishes a pivotal connection between the main frame beam 1 and an intermediate frame beam 4 which is in line with the main frame beam. At the end away from the beam 1, the beam 4 has a gearbox 5, which serves to support the beam 4 on a carrier frame 6 arranged on the rear of a threepoint trestle 7. The trestle 7 is coupled in operation with the three-point lifting device 8 of a tractor 9. The frame 6 is secured to the gear box 5 by means of a removable pin 10 which allows the mowing machine to be turned from the position of FIG. 1 through about 90° about an upwardly extending shaft 11 to bring it into a position in which it lies behind the tractor. The gear box 5 is connected, in a manner not shown in detail, with the power take-off shaft of the tractor and the gear box 5 is also connected with a driving shaft 12 accommodated in the hollow beam 4 and provided, at the level of the pivotal shaft 3, with a universal joint 13. The main frame beam 1 has a gear box 14 connected with the plates 2 and secured to the top of the beam 1. The gearbox 14 is coupled with the driving shaft 12. The bear box 14 comprises a bevel pinion transmission and drives gears 15 located in the beam 1. The gear 15 located beneath the gear box is the first of a sequence of seven identical gears arranged side by side in a row, of which two gears wheels 15A are disposed vertically above two respective rotors 16; between these two gears 15A there are five gears 15B which are arranged so that the rotors 16 are driven, in operation, in opposite senses, as indicated by the arrows B.

Figure 2:
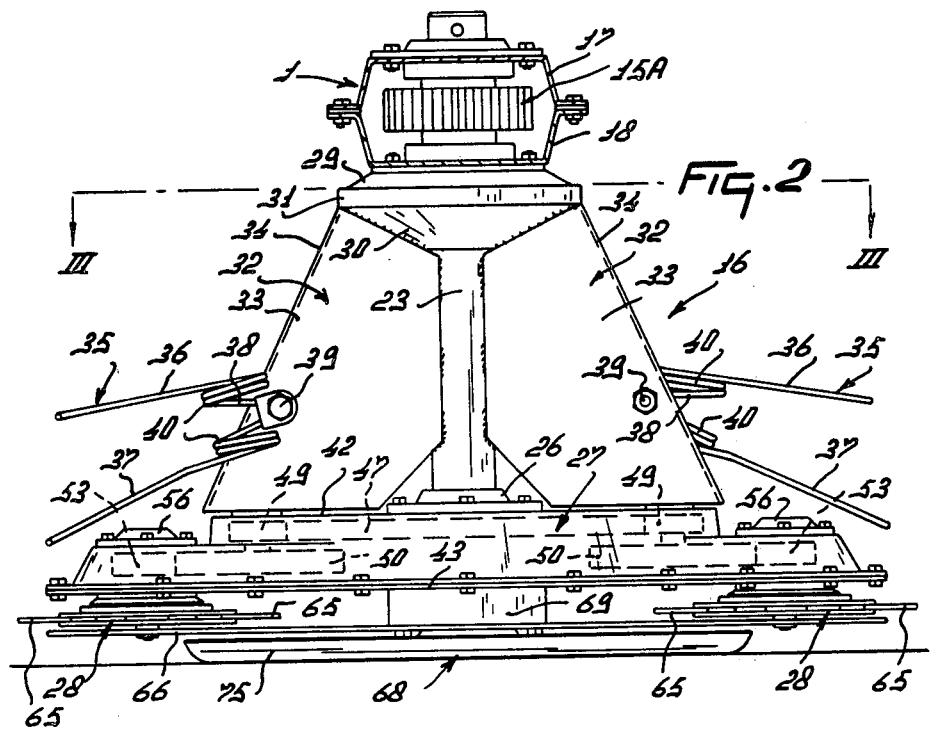
FIG. 2 is a sectional view taken on the line II—II in FIG. 1.

Referring to FIG. 2, the frame formed by the main frame beam 1 comprises a top plate 17 and a bottom plate 18, which are formed by pressing and which are bolted to one another. The plates 17 and 18 form an upper bearing housing or gear casing for the rotors 16 beneath it. Each rotor 16 comprising a main shaft 19 (see Figure), which is connected at the top of the plate 17 by a pin 20 with a bearing cover 21, which is secured to the top of the plate 17. The cover 21 accommodates a bearing 22 which surrounds a hollow shaft or quill 23. The hollow shaft 23 has splines for receiving the gear 15A. Beneath the gear 15A there is a bearing 24 disposed around the hollow shaft 23 and connected by a cover 25 with the bottom of the plate 18. In this way the hollow shaft 23 is supported both at the top and at the bottom of the beam 1. The hollow shaft 23 is clear of the main shaft 19 and extends downwardly from the frame 1. At the lower end the hollow shaft 23 is rigidly secured to a bearing cap 26 arranged on the top of a lower gear box or bearing housing 27, in which two mowing elements 28 are journalled. The hollow shaft 23 preferably extends to near the level of the mowing members 28.

Figure 3:
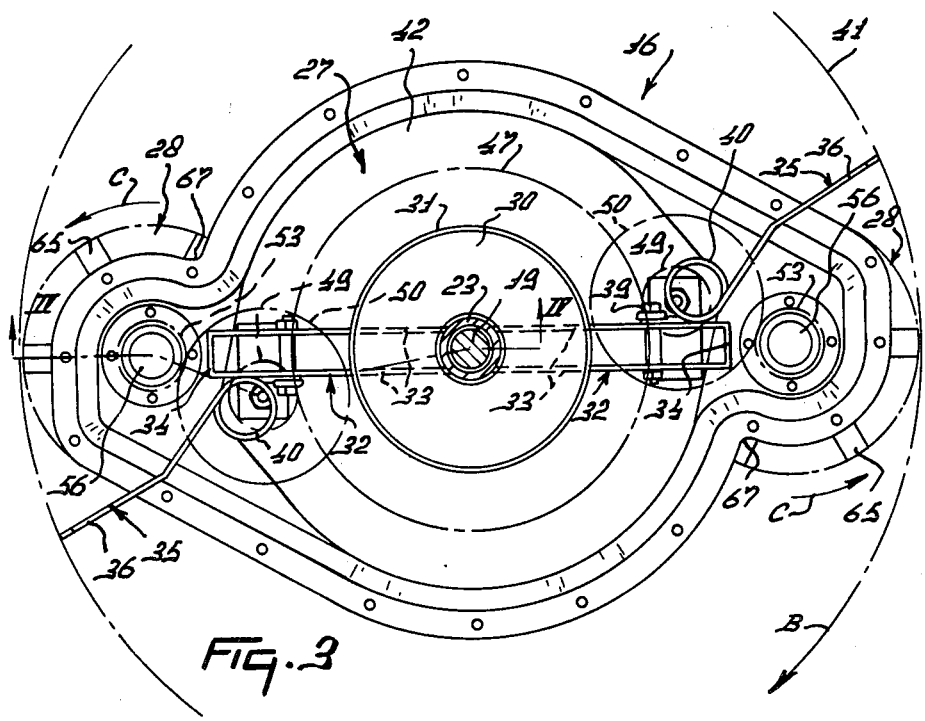
FIG. 3 is a sectional view taken on the line III—III in FIG. 2.

To the bottom of the plate 18 is fastened a skirt 29 which surrounds the cover 25. The skirt 29 co-operates with an at least partly conical housing 30, which is rigidly secured to the hollow shaft 23 and which comprises a cylindrical upper portion 31, which preferably surrounds the ring 29. In this way a satisfactory seal is obtained at the top of the rotor 16 for the gear box formed by the plates 17 and 18. As is shown in FIGS. 2 and 3, the housing 30 serves at the same time as a fastening member for two flat vanes 32 arranged diametrically of the shaft 19 and comprising each two parallel plates 33, which are interconnected at the sides away from the hollow shaft 23 by a web 34. The plates 33 extend downwardly from the housing 30, as shown in the elevational view of FIG. 2, to near the level of the mowing elements 28. The plate 34 is, in this embodiment, at an angle of about 25° to the shaft 19. The plates 33 are welded beneath the housing 30 to the hollow shaft 23. The plane of symmetry of each vane 32 extends radially of the shaft 19. Near the lower end of the hollow shaft 23, the plates 33 leave a gap to provide access to the cap 26. The trailing side of each vane 32 is provided with a crop displacing member 35 in the form of two spring steel tines 36 and 37, which are, in this embodiment, made from a single length of material and which have a common fastening portion 38 secured to the vane 32 by a bolt 39. The tines extend slightly to the rear with respect to the radial line going through the fastening portion 38, so that they occupy a slightly trailing position. Between the fastening portion 38 and the two tines 36 and 37 there are provided a number of coils 40. The lower tine 37 preferably extends to near the level of the mowing elements 28, while, as viewed on plan, the free ends of the tines preferably extend to near the path 41 described by the outer ends of the mowing elements 28.

Figure 4:
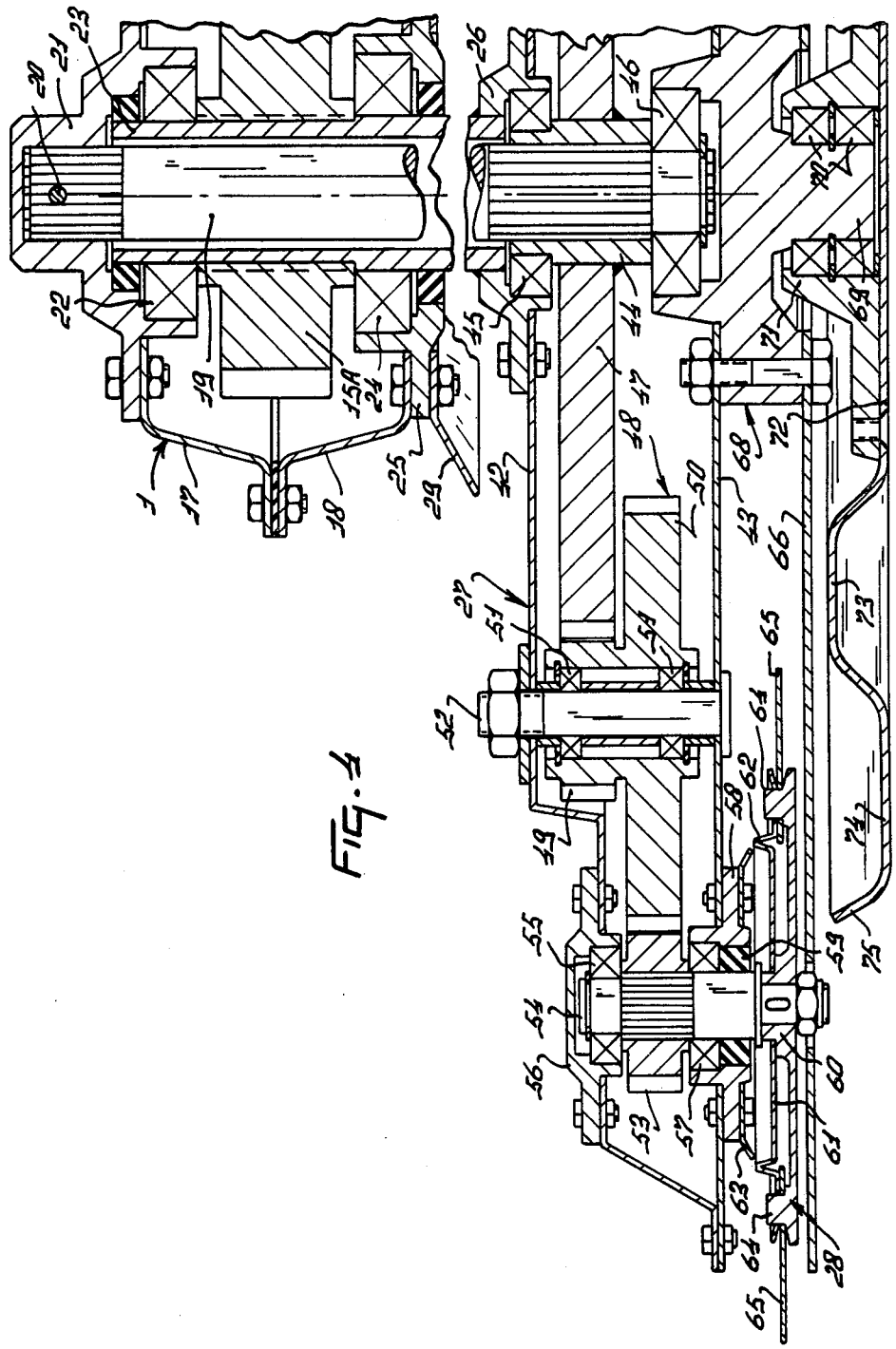
FIG. 4 is a sectional view taken on the line IV—IV in FIG. 3.

Referring to FIG. 4, the gear box 27 comprises a top plate 42 and a bottom plate 43, which are formed by pressing, the shape of these plates matching the disposition of the two mowing elements 28, as shown in the plan view of FIG. 3, which will be described more fully later in this description. In the bearing housing 27, the lower portion of the main shaft 19 is splined and receives a sleeve 44, which is supported in an upper bearing 45 in the cap 26 and by a bearing 46 on the lower end portion of the shaft 19. The sleeve 44 is welded to a sun gear 47, which comprises part of a planetary gear arrangement accommodated in the gear box 27. The sun gear 47 is rigidly secured by means of the sleeve 44 to the central shaft 19 and thus to the frame 1. Between each mowing element 28 and the sun gear 47 there is an intermediate gear 48 which comprises an upper pinion 49 engaging the sun gear 47 and a lower pinion 50 engaging the mowing element 28. The diameters of the upper and lower portions 49 and 50 have, in this embodiment, a ratio of about 3:8- The intermediate gear 48 is supported by bearings 51 on a bolt 52, which is secured to the plates 42 and 43. The lower pinion 50 of the intermediate gear 48 meshes with a gear 53, of comparatively small diameter, which is rigidly secured to a shaft 54 which is coaxial with the axis of the mowing element 28. The shaft 54 is preferably parallel to the shaft 19 and is journalled at the top end in a bearing 55, which is secured by means of a cap 56 to the top of the plate 42. The shaft 54 is supported at a location beneath the gear 53 by a bearing 57 and a bearing cap 58 on the bottom of the plate 43. The bearing housing 27 is sealed beneath the bearing 57 by an oil arrester packing 59. The portion of the shaft 54 projecting beneath the gear box 27 forms a fastening member for a circular plate 60. Above the plate 60 is arranged a thin spring steel plate 61, which is secured, near the shaft 54, to the plate 60 and is provided at a distance from the shaft 54 with an annular rim 62 surrounding the shaft. The rim 62 provides, together with an annular hood 63 around the ring 58, protection against matter winding around the shaft 54. The plate 60 has, near its periphery, eight lugs 64 distributed at equal distances from one another. Each lug 64 carries a cutter blade 65, which is freely pivotable about the lug 64 and is capable of turning through an angle of 360° owing to the space between the plates 60 and 61. The cutter blades 65 can be mounted easily by bending the plate 61 upwards so that the lug 64 is free at the top.

The two mowing elements of each rotor 16 are covered on the bottom by a base plate 66 lying parallel to the plate 43. As viewed in a direction parallel to the shaft 19, the shape of the periphery of the plate 66 corresponds with that of the plates 42 and 43. As shown on plan in FIG. 3, the periphery at a position between the two mowing elements 28 in concentric with the shaft 19. Progressing in a direction opposite to the direction of rotation B of the rotor 16, this concentric part meets a portion which is concentric with the shaft 54. A corner 67 is thus formed which constitutes the point where the cutter blades 65 move from beneath the plates 42 and 43 as they rotate about the shaft 54. This rotation takes place in the direction of the arrow C, which is opposite the direction of the arrow B at the outer periphery, because of the disposition of the intermediate wheel 48. From the corner 67, the periphery of the plates 42, 43 and 66 is concentric with the shaft 54 over an arc of about 125°, this arc meeting a straight portion directed tangentially of the shaft 54. This straight portion meets another straight portion which in turn meets the portion concentric with the shaft 19 on the other side of the shaft 19. The free end of each cutter blade moves, as the transition between the two straight portions, beneath the plates 42 and 43. Thus the operative portion of the mowing element 28 covers an arc of about 180° in which it is beyond the guard formed by the plates 42, 43 and 66. The tines 36 and 37 are located, as shown on plan in FIG. 3, behind the operative portion of the mowing element 28 with respect to the arrow B. The diameter of the mowing elements 28 preferably amounts to twenty-four centimeters and the diameter of the paths 41 is preferably about eighty-four centimeters. Owing to the overlap of the paths 41 of the two rotors 16, as shown in FIG. 1, the working width of the machine is about 1.60 meters. This overlap is permitted because the mowing elements 28 of the two rotors are offset by 90°.

The plates 43 and 66 are connected to a central carrier 68, which fits at the top around the bearing 46 and has a cavity receiving the lower end portion of the shaft 19. The carrier 68 has on the bottom a cylindrical portion 69, in line with the shaft 19, on which are arranged two bearings 70. The bearings 70 are accommodated inside a housing 71, which is secured to the top of a supporting member 72. The supporting member 72 is flat at the region beneath the housing 71 and in operation this part bears on the ground. Further out from the housing 71, the supporting member 72 has an upwardly bent part 73, which is coaxial with the portion 69 and which joins a flat part 74, which also bears on the ground. Near the periphery the supporting member 72 has an upwardly directed rim 75, the supporting member 72 thus being dished. The distance of the rim 75 from the portion 69 corresponds with the distance of the outermost part of the gear wheel 48 from the shaft 19.

The mowing machine described with reference to FIGS. 1 to 4 operates as follows.

During operation the mowing machine is driven from the tractor 9 by means of the shaft 12, the gear box 14 and the gear wheels 15. The gears 15A rotate with a speed of about 500 RPM, which speed is with the driving arrangement described, the speed of the rotors 16. From the gear 15A the rotor 16 is rotated by means of the hollow shaft 23 in the direction of the arrow B. The crop displacing members 35 rotating with the rotor 16 thus displace the crop at a comparatively slow rate. With the described disposition of the planetary gear arrangement inside the gear box 27, the mowing elements will rotate during operation with a speed of about 9000 RPM. The sun gear 47 is fixed while the intermediate gear 48 provides an opposite direction of rotation, indicated by the arrow C, for the mowing elements 28 and, in addition, an appreciably higher speed of rotation of the mowing elements 28. Owing to the small thickness of the cutter blades 65, which may be made of sheet material of one millimeter thickness, an extremely effective cutting operation is achieved with this very high speed. In this connection the specific design of the guard around the mowing elements 28 formed by the plates 42, 43 and 66 is important. Owing to the shape of the guard near the corner 67 and to the concentric shape of the portion of the periphery projecting beyond the axis of the mowing member, the resultant cutting operation is such that during each rotation in the direction of the arrow B strips of crop are cut, the width of these strips corresponding at least to the distance covered by the mowing machine in the direction A. In this connection, because of the movement of the cutter blades 65 in the direction of the arrow C, clogging of crop cannot occur. The cut crop is subsequently directly engaged by the tines 36 and 37 and conveyed to the rear in the direction of the arrow B. By means of two swath forming members 76, which converge towards the rear, the crop can be deposited in an airy swath. Alternatively, by turning the swath forming members about upwardly extending shafts 76A, the swath forming member can be moved and fixed, by a pin 76B, in a different position. Thus, if desired, the crop can be airily tedded and deposited over a proportionally larger width.

FIGS. 5 and 6 show an alternative embodiment of mowing machine, in which corresponding parts are designated by the same reference numerals. With the lower pinion of the gear wheel 48 co-operates a gear 77 forming part of an alternative structure to the mowing element 28. The gear 77 is arranged on splines of a sleeve 79, which is connected by bearings 80 and caps 81 and 82 respectively with the plates 42 and 43 in the manner described in the preceding embodiment. The top of the cap 81 is provided with a cylindrical housing 83, which is open at the top. The housing 83 accommodates a cylindrical supply holder 84, which is closed at the top by a cover 85. The holder 84 is connected at the bottom with the top end portion of the sleeve 79. In the holder there are disposed, in pairs, parallel partitions 86 (see FIG. 6), each pair of partitions being diametrically opposite another pair and perpendicular to adjacent pairs. Each parallel pair of partitions 86 bounds a space, which is further bounded near the rotary axis 79A of the sleeve 79 by a cross-wise separating partition 87 made up of plates 88 which are at an angle of about 45° to the partitions 86. Above the sleeve 79, the plates 88 are slightly widened as shown in FIG. 5. In the space enclosed by the parallel partitions 86 and the adjacent plates 88 there is a supply of cutter member 89 in a wound-up state. From the holder 84 the cutter member is guided through an axial feed channel formed by one of the compartments formed by the partition 87. The partition 87 has a bolt 90 which establishes, at the lower end of the mowing element 78, a connection between the sleeve 79 and a central guide part 91, which is surrounded by a plate 92. Above the plate 92 there is a plate 93 having a rim 94 bent over at right angles, this plate 93 being fixed to the sleeve 79. The axial feed inside the hollow shaft 79 is deflected gradually along the central part 91 and the plate 93 as shown in FIG. 5 through an arc of about 90° into a radially outward disposition. The bend of the feed extends through an arc of a comparatively large radius so that the cutter member can slide smoothly along the feed channel. The rim 94 co-operates with an outwardly and downwardly bent-over part 95 of the cap 82 to give satisfactory protection against dirt tending to penetrate into the space around the sleeve 79. The mowing element 78 has four cutter members 89, each of which is guided through the associated axial and subsequently radial feed channel. Each cutter member is preferably formed by linked elements comprising spring steel links. The links are preferably made from sheet material about one millimeter thick. Since each cutter member 89 is located in the supply holder 84 in an associated separate chamber, formed by the space between the partitions 86, the space in the sleeve 79 and the space between the plates 92 and 93, the cutting members cannot intermingle. In order to fix the retractable cutter member 89 in an operative position, a spring steel plate 96 is arranged on the top of the plate 93, this plate 96 having a downwardly projecting rim 97 which extends between the plates 92 and 93 into a link of the chain constituted by the cutter member. In this way the cutter member can be locked in place.

The mowing machine described with reference to FIGS. 5 and 6 has the same mowing action as the mower in the first embodiment. In this embodiment, the cutter member can be retracted with or extended from the holder 84 so that, in the case of wear, the cutter member can be extended to its desired operative length. It is a great advantage that the cutter member has the form of a chain which provides a pivotable dispostion of the part of the cutter member located outside the feed channel. Moreover, a smooth passage through the feed channel is thus ensured. By lifting the cover 85, the supply can be replenished in a simple manner. Since the supply is located above the operative portion of the cutting member, the supply is readily accessible, and can be easily checked. The high position of the supply minimizes the risk of soiling or damage or both to the cutter member.

Although various features of the mowing machines described and illustrated in the drawings are set forth in the following claims as inventive features, the invention is not necessarily limited to these features and may encompasses other disclosed features both individually and in various combinations.

Having described my invention, what I claim as new and desire to secure by Letters Patent of the United States:

1. A mowing machine comprising a rotor including means for mowing cut crop which is mounted for rotation at a first rpm about a substantially vertical main axis, a mowing element mounted on said rotor for rotation at a second rpm higher than said first rpm about a substantially vertical further axis which is spaced from said main axis, said rotor including a plate which is disposed beneath said mowing element, a first part of the periphery of said plate being arcuate and spaced outward of said further axis by a first distance, a second part of the periphery of said plate also being arcuate and spaced outward of said main axis by a second distance which is longer than said first distance.

2. A mowing machine as claimed in claim 1, in which said rotor is provided with a supporting member which supports said rotor on the ground.

3. A mowing machine as claimed in claim 2, in which said plate is disposed between said supporting member and said mowing element.

4. A mowing machine as claimed in claim 1 wherein said rotatable mowing element includes a cutter member which is mounted for displacement through a sleeve, said sleeve being rotatable in a direction opposite said mowing element.

5. A mowing machine as claimed in claim 4, in which said cutter member is mounted in a holder communicating with said sleeve for displacement outwardly of said mowing element.

6. A mowing machine as claimed in claim 1 wherein a cutter member is provided in said mowing element mounted for displacement outwardly thereof, a feed channel along which said cutter member is displaceable, a holder for said cutter member communicating with said feed channel, at least a part of said feed channel extending axially of said mowing element.

7. A mowing machine as claimed in claim 6, in which said cutter member comprises a plurality of linked elements.

8. A mowing machine as claimed in claim 1 comprising a cutter member which is mounted for displacement outwardly of said mowing element, said cutter member comprising a plurality of linked elements.

9. A mowing machine as claimed in claim 8, in which a rotor is provided above said mowing element, said rotor including at least one feed channel for guiding said plurality of linked elements.

10. A mowing machine as claimed in claim 9, in which said feed channel is defined by pairs of diametrically disposed plates.

11. A mowing machine as claimed in claim 9, in which said rotor is provided with crop displacing members.

12. A mowing machine as claimed in claim 8, in which crop displacing members are mounted on a further plate provided above said cutter member, said crop displacing members comprising tines fastened to said further plate.

13. A mowing machine as claimed in claim 12, in which, with respect to the direction of rotation of said rotor, said tines trail behind said further plate.

14. A mowing machine as claimed in claim 8, in which said rotor is fastened to a hollow shaft extending from a frame of the machine to near the level of said mowing element.

15. A mowing machine as claimed in claim 1 comprising a frame, said rotor being secured to a hollow shaft extending from said frame substantially at the level of said mowing element.

16. A mowing machine as claimed in claim 15 in which said hollow shaft is connected at its lower end with the top of a gear box.

17. A mowing machine as claimed in claim 16, in which said hollow shaft is journalled at both the top and the bottom of said frame.

18. A mowing machine as claimed in claim 17, in which said hollow shaft is surrounded within said frame by a gear adapted to drive said rotor.

19. A mowing machine as claimed in claim 15, in which said hollow shaft is coaxial with said main axis.

20. A mowing machine as claimed in claim 19, in which a main shaft is disposed coaxially with said main axis and is rigidly secured to the frame at the top.

21. A mowing machine as claimed in claim 15, in which said mowing element has at least three cutter members.

22. A mowing machine as claimed in claim 21, in which means for driving said rotor is provided whereby the speed of said rotor in operation is about five hundred RPM.

23. A mowing machine as claimed in claim 22, in which means is provided for driving said element whereby the speed of said mowing element in operation is about nine thousand RPM.

24. A mowing machine as claimed in claim 23, in which the working width of the machine is about 1.60 meters.

25. A mowing machine as claimed in claim 15, in which means are provided for hitching the machine to the lifting device of a tractor.

26. A mowing machine as claimed in claim 25, in which means are provided for driving the machine from the power take-off shaft of the tractor.

27. A mowing machine comprising a rotor including tine means thereon which are mounted for rotation about a substantially vertical main axis, a mowing element mounted on said rotor for rotation about a substantially vertical further axis which is spaced from said main axis, the rotor including a plate which, in operation, rotates with said mowing element about said main axis, said plate being disposed between said mowing element and a supporting member which is provided on said rotor for supporting said rotor on the ground, a first part of the periphery of said plate substantially conforming to the circumference of a first circle for about 125° having its center at said further axis, a second part of said periphery conforming to the circumference of a second circle having its center at said main axis, said first circle having a radius shorter than said second circle which is less than the distance between said axes whereby the operative portion of said element relative is an arc of about 180° where it extends beyond said first periphery part, said tine means spaced relative to the direction of rotation of said rotor behind said first periphery part.

28. A mowing machine as claimed in claim 27, in which said mowing element is located between the plate and a member disposed above said plate.

29. A mowing machine as claimed in claim 28, in which said plate extends parallel to said member.

30. A mowing machine as claimed in claim 29, in which, as viewed in a direction parallel to said main axis, said plate and said member have the same peripheral configuration.

31. A mowing machine as claimed in claim 30, in which said member disposed above said mowing element comprises part of a gear box accommodating means for driving said mowing element.

32. A mowing machine as claimed in claim 31, in which said mowing element is journalled in said gear box.

33. A mowing machine as claimed in claim 32, in which said mowing element is one of two mowing elements journalled in said gear box.

34. A mowing machine as claimed in claim 33, in which said two mowing elements are disposed diametrically opposite one another with respect to said main axis.

35. A mowing machine as claimed in claim 32, in which said mowing element is driven by means of a sun gear disposed in said gear box coaxially with said main axis.

36. A mowing machine as claimed in claim 35, in which an intermediate gear is arranged between said mowing element and said sun gear.

37. A mowing machine as claimed in claim 36, in which said intermediate gear comprises an upper pinion engaging said sun gear and a lower pinion engaging a planetary gear disposed coaxially with said further axis.

38. A mowing machine as claimed in claim 30, in which the two said periphery parts meet at a location where the path of the operative portion of said mowing element, in operation, crosses the periphery of said plate, as viewed in plan.

39. A mowing machine as claimed in claim 38, in which, as viewed in plan, said mowing element projects beyond said plate over an arc of approximately 180°.

40. A mowing machine as claimed in claim 30, in which said plate is asymmetrical with respect to the plane containing said further axis and said main axis.

41. A mowing machine as claimed in claim 40, in which, with respect to the direction of rotation of said rotor, a portion of the periphery of said plate which trails said further axis is straight.

42. A mowing machine as claimed in claim 27, in which said mowing element is mounted on a sleeve included in said rotor.

43. A mowing machine comprising a rotor which is mounted for driven rotation about a substantially vertical main axis, said rotor carrying a mowing element which is fastened to a sleeve provided in said rotor and is mounted for driven rotation about a substantially vertical further axis which is spaced from said main axis, said rotor including a plate which completely underlies said sleeve, the periphery of said plate being curved in a first part spaced around said further axis by a first distance and being curved in a second part spaced around said main axis by a second distance greater than said first distance but less than a third distance between said axes, said mowing element including a cutter member which extends outwardly of said first periphery part.

44. A mowing machine as claimed in claim 43, which includes a gear box, said sleeve extending across said gear box.

45. A mowing machine as claimed in claim 44, in which said sleeve is coaxial with said mowing element.

46. A mowing machine as claimed in claim 45, in which said sleeve is provided at its circumference with a planetary wheel adapted to drive said mowing element.

47. A mowing machine as claimed in claim 45, in which said cutting member is mounted for displacement through a feed channel formed by said sleeve.

48. A mowing machine which comprises a horizontal frame adapted to be mounted laterally of a tractor from a lifting device of the tractor, at least two rotors journalled from and extending below said frame, drive means carried by said frame for rotating said rotors, a hollow tube in each said rotor connected to said drive means to rotate about a main axis of rotation, at least two cutter members carried by each said rotor, each said cutter member having a further axis of rotation spaced from said main axis of rotation of said hollow tube, means for rotating said cutter members at least ten times the rate of said hollow tube, a plate member affixed to and extending radially from each said hollow tube, each said plate member having a first periphery part which is arcuate relative to said further axis of its said cutter member and a second periphery part which is also arcuate relative to its said main axis and is spaced therefrom a distance which is substantially greater than the distance said first periphery part is spaced from said further axis.

* * * * *